US012583034B2

(12) United States Patent
Maier

(10) Patent No.: US 12,583,034 B2
(45) Date of Patent: Mar. 24, 2026

(54) PRINT HEAD FOR 3D PRINTING OF METALS

(71) Applicant: Robert Bosch GmbH, Stuttgart (DE)

(72) Inventor: Eberhard Maier, Koengen (DE)

(73) Assignee: Robert Bosch GmbH, Stuttgart (DE)

( * ) Notice: Subject to any disclaimer, the term of this patent is extended or adjusted under 35 U.S.C. 154(b) by 908 days.

(21) Appl. No.: 17/785,540

(22) PCT Filed: Dec. 8, 2020

(86) PCT No.: PCT/EP2020/085067
§ 371 (c)(1),
(2) Date: Jun. 15, 2022

(87) PCT Pub. No.: WO2021/122153
PCT Pub. Date: Jun. 24, 2021

(65) Prior Publication Data
US 2023/0031401 A1      Feb. 2, 2023

(30) Foreign Application Priority Data

Dec. 17, 2019      (DE) ..................... 10 2019 219 844.9

(51) Int. Cl.
B22F 12/53          (2021.01)
B22F 3/115          (2006.01)
(Continued)

(52) U.S. Cl.
CPC .............. B22F 12/53 (2021.01); B22F 3/115 (2013.01); B22F 10/22 (2021.01); B22F 12/20 (2021.01);
(Continued)

(58) Field of Classification Search
CPC .......... B22F 12/53; B22F 10/22; B22F 12/20; B22F 2999/00; B22F 3/115;
(Continued)

(56) References Cited

U.S. PATENT DOCUMENTS

| | | | |
|---|---|---|---|
| 12,257,630 B2* | 3/2025 | Friedrich | ............... B33Y 30/00 |
| 2024/0051031 A1* | 2/2024 | Glasschröder | ......... B33Y 50/02 |
| 2024/0253306 A1* | 8/2024 | Glasschröder | ........ B29C 64/227 |

FOREIGN PATENT DOCUMENTS

| | | |
|---|---|---|
| CN | 103785834 A | 5/2014 |
| CN | 106186644 A | 12/2016 |

(Continued)

OTHER PUBLICATIONS

English Machine Translation of CN 103785834 A (Year: 2025).*

(Continued)

*Primary Examiner* — Melvin C. Mayes
(74) *Attorney, Agent, or Firm* — Michael Best & Friedrich LLP

(57)      ABSTRACT

The invention relates to a print head for a 3D printer comprising a housing, a device for supplying a metal, a piston, a reservoir with an outlet opening and an actuator device, the housing comprising at least a cooling flange, an insulating plate and the reservoir. The reservoir is connected to the cooling flange and/or the insulating plate by a centering device comprising a flange, a clamping device and a centering sleeve, an active surface connects the reservoir to the flange such that the reservoir is concentrically aligned with respect to the cooling flange and/or the insulating plate, the clamping device connects the flange to the cooling flange and/or the insulating plate, and the centering sleeve is arranged in the cooling flange and/or the insulating plate such that the centering sleeve centrally aligns the piston with respect to the reservoir.

3 Claims, 2 Drawing Sheets

(51) Int. Cl.

| | |
|---|---|
| *B22F 10/22* | (2021.01) |
| *B22F 12/20* | (2021.01) |
| *B29C 64/112* | (2017.01) |
| *B29C 64/118* | (2017.01) |
| *B33Y 30/00* | (2015.01) |
| *B41J 2/14* | (2006.01) |
| *B41J 2/155* | (2006.01) |

(52) U.S. Cl.
CPC .......... *B29C 64/112* (2017.08); *B29C 64/118* (2017.08); *B33Y 30/00* (2014.12); *B41J 2/14* (2013.01); *B41J 2/14233* (2013.01); *B41J 2/155* (2013.01)

(58) Field of Classification Search
CPC ........ B22F 2009/088; B22F 2009/0888; B22F 2009/0892; B33Y 30/00; Y02P 10/25
See application file for complete search history.

(56) References Cited

FOREIGN PATENT DOCUMENTS

| | | | | |
|---|---|---|---|---|
| CN | 206967960 U | | 2/2018 | |
| CN | 207508057 U | * | 6/2018 | |
| DE | 102016224047 A1 | | 6/2018 | |
| DE | 102017221178 A1 | * | 5/2019 | .............. B22F 12/53 |
| EP | 3488951 A1 | | 5/2019 | |
| TW | 201924808 A | | 7/2019 | |
| WO | 2019101436 A1 | | 5/2019 | |

OTHER PUBLICATIONS

English Machine Translation of CN 206967960 U (Year: 2025).*
English Machine Translation of CN 207508057 U (Year: 2025).*
Translation of International Search Report for Application No. PCT/EP2020/085067 dated Feb. 1, 2021 (2 pages).

* cited by examiner

PRINT HEAD FOR 3D PRINTING OF METALS

BACKGROUND

The invention relates to a print head for a 3D printer which is suitable for printing metals, and to a method for operating and/or setting up a print head.

A 3D printer for a thermoplastic material receives a solid phase of this material as starting material, produces a liquid phase therefrom and applies this liquid phase selectively to the locations which belong to the object to be produced. Such a 3D printer comprises a print head in which the starting material is melted. Means are furthermore provided for generating a relative movement between the print head and the working surface on which the object is intended to be formed. In this case, only the print head, only the working surface, or both the print head and the working surface may be moved.

The print head has a first operating state, in which liquid material emerges from it, and a second operating state in which no liquid material emerges from it. The second operating state is adopted, for example, when a different position on the working surface is to be approached and no material is intended to be deposited on the way there. For example, it is possible to switch between the two operating states of the print head by turning the feed of the solid starting material on or off.

Compared with thermoplastics, metals have a substantially higher melting point and furthermore a substantially lower viscosity in the liquid state.

3D metal printers, in particular drop-on-demand printers, such as are disclosed for example in the published patent application DE 102016224047 A1, are attractive for industrial applications but must, inter alia, meet the following requirements:

guaranteeing continuous operation, reproducibility of the drops, i.e. of the structure of the component, energy efficiency in respect of the melting and the component production, maintaining short non-productive times, for example for setting up and when shutting down, and replacement of expendable parts.

The liquid metal is often melted in a ceramic or ceramic-like crucible, or a reservoir. A problem then arises because of the relative movement between the crucible and the upper part of the metallic print head.

Furthermore, the use of materials for the adaptation of the actuator is restricted, since materials with a low thermal conductivity are preferable in order to impede the heat transport. In most cases, the actuators have a working temperature range<150° C., which should not be exceeded

SUMMARY

The object is achieved by the print head according to the invention and the method for operating and/or setting up the print head.

The print head according to the invention for a 3D printer, in particular a metal printer, comprises a housing, a device for supplying a metal, a piston, a reservoir having an outlet opening, and an actuator device for driving the piston, the reservoir comprising a melting region and a displacement space for a liquid phase of the metal, the melting region being adjacent to an inert atmosphere and connected to the displacement space in such a way that the liquid phase of the metal can be made to pass through the outlet opening by driving the piston. Furthermore, the housing is configured in a plurality of parts and comprises at least a cooling flange, an insulating plate and the reservoir.

According to the invention, the reservoir is connected to the cooling flange and/or the insulating plate by a centering device.

In one refinement, the centering device comprises at least a flange, a clamping device and a centering sleeve.

In one refinement, the reservoir is connected to the flange via an active surface, in such a way that the reservoir is aligned concentrically with respect to the cooling flange and/or the insulating plate.

In one refinement, the flange is connected to the cooling flange and/or the insulating plate via the clamping device.

In one refinement, the clamping device is formed by clamping screws which are braced on the cooling flange by means of disk springs.

In one refinement, the centering sleeve is arranged in the cooling flange and/or the insulating plate in such a way that the piston is aligned centrally with respect to the reservoir.

Since the liquid metal is often melted in a ceramic or ceramic-like crucible, or the reservoir, a relative movement takes place between the crucible and the upper metallic print head. The invention advantageously ensures that a relative movement of the materials having different thermal expansion is allowed, but they nevertheless remain centrally positioned with respect to one another.

Because of the large relative movement between the crucible and the metallic surround and the contact surface with the upper part of the print head, an expansion range must be made possible axially and radially, which is advantageously achieved by the invention. If only a radial gap were to be available, the crucible would not be centered. There is then the risk that by the multiple relative movement because of the multiple passes through the temperature excursion, the latter would bear off-center on the heater, or inductor. The nozzle would therefore be shifted by the same amount, so that the piston guide would be aligned off-center with respect to the piston, i.e. the two components would no longer be flush. Since this is counter-productive for reproducible actuation and uniform droplet production, the invention, in particular the centering device, advantageously ensures concentric alignment and a resilient prestress.

Furthermore, the invention advantageously ensures that effective "reversible" centering is made possible over the entire temperature excursion. Furthermore, stresses in the ceramic crucible, or reservoir, which may arise due to the thermal expansion being prevented, are advantageously avoided. Manufacturing tolerances are substantially compensated for, and the concentric position of the piston in the piston guide is assured.

Advantageously, reproducible actuation, or a reproducible output by the piston in the print head, is thereby achieved.

The melting region is advantageously adjacent to an inert atmosphere. This assures that the pressure on the melt is almost constant, so that it has no effect on the printing quality. Furthermore, the inert atmosphere ensures that no undesired chemical reaction takes place in the reservoir. For example, the inert atmosphere may be formed from nitrogen or another inert gas.

The reservoir advantageously comprises the melting region for melting the metal, this region being adjacent to the inert atmosphere as well as the displacement space. It is thereby possible to spatially separate the melting process from the displacement or printing process, so that the reproducibility of the drops, or of a component, is improved.

In this case, the liquid phase of the metal present in the displacement space may advantageously be made to pass through the outlet opening by driving the piston. The piston in this case advantageously bears directly on the melt, so that the accuracy of the printing is further increased since the melt is almost incompressible. The melt, or liquid phase of the metal, enters the displacement space from the melting region either by means of gravitational pressure or by means of a combination of gravitational pressure and the atmospheric pressure of the inert gas. The outlet opening corresponds to a nozzle and, depending on the design of the reservoir, is replaceable.

The housing is advantageously formed in a plurality of parts so as to guarantee suitable temperature management and, by the use of different materials, continuous operation. The multipart configuration furthermore provides a modular design which allows replacement of the constituent parts according to requirements. In addition, owing to the multipart housing, the print head is configured in such a way that the different functions may also be performed by different components.

Further measures that improve the invention will be presented in more detail below together with the description of the preferred exemplary embodiment of the invention with the aid of the figures.

DETAILED DESCRIPTION

Figure 1:
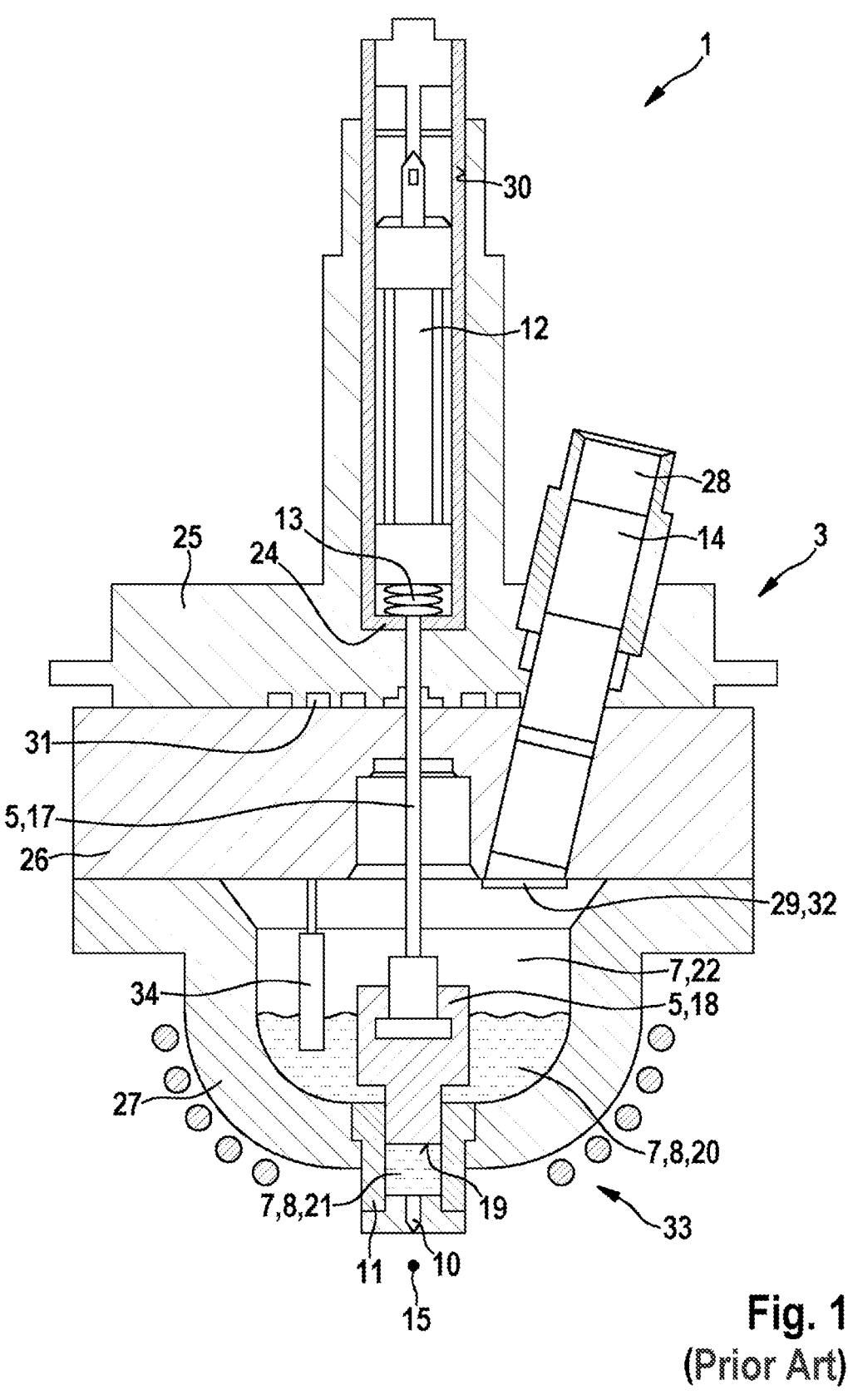
FIG. 1 shows an example of a print head according to the prior art.

FIG. 1 shows an example of a known print head 1 for a 3D printer, in particular a metal printer.

The print head 1 comprises a housing 3, a device 28 for supplying a metal 14 in solid phase, a piston 5, a reservoir 7, 27 having an outlet opening 10, and an actuator device 12 for driving the piston. The reservoir 7, 27 comprises a melting region 20 and a displacement space 21 for a liquid phase 8 of the metal 14, the melting region 20 being adjacent to an inert atmosphere 22 and connected to the displacement space 21 in such a way that the liquid phase 8 of the metal 14 can be made to pass through the outlet opening 10 by driving the piston 5. The liquid phase 8 of the metal 14 is also referred to as the melt 8, and the inert atmosphere 22 is formed by introducing an inert gas 22 into the reservoir 7, 27. The introduction of the inert gas 22 into the reservoir 7, 27 preferably takes place through a cold region of the print head 1.

The housing 3 is configured in a plurality of parts and comprises at least a cooling flange 25, an insulating plate 26 and the reservoir 7, 27.

The piston 5 is configured in a plurality of parts and comprises at least a piston rod 17 made of a metallic material and a plunger 18 made of ceramic. The piston rod 17 extends starting from the actuator device 12 through the cooling flange 25 and the insulating plate 26 into the reservoir 7, 27, where it merges into the plunger 18.

The cooling flange 25 comprises a recess 30 for accommodating the actuator device 12, which is configured as a piezoelectric actuator 12. The piezoelectric actuator 12 is fixed in the recess 30 during operation in such a way that, when a voltage is applied, it exerts a working stroke on the piston 5, particularly on the piston rod 17 of the piston. The piston rod 17 transmits the working stroke onto the plunger 18, so that the latter causes the liquid phase 8 of the metal 14 to emerge through the outlet opening 10. In the absence of actuation of the actuator 12, the piston 5 can be restored into an initial setting by a spring 13, the spring 13 being arranged in the recess 30 of the cooling flange 25, between a shoulder 24 and the actuator 12. The spring 13 is configured as a disk spring.

The cooling flange 25 furthermore comprises cooling channels 31 for cooling. The cooling channels 31 are arranged between the cooling flange 25 and the insulating plate 26, and a coolant flows through them. This is used as cooling against the heating by the melt 8 and for cooling the actuator 12 during operation. The cooling flange 25 is made of a metallic material.

The insulating plate 26 arranged on the cooling flange 25, on sides of the cooling channels 31, is formed from a thermally insulating material and is configured in such a way that it reduces heat transfer from the reservoir 7, 27 to the cooling flange 25.

The device 28 for supplying the metal 14 opens into the reservoir 7, 27 and is arranged in the cooling flange 25 and the insulating plate 26. The device 28 extends through the cooling flange 25 and the insulating plate 26, and the metal 14, or the material 14 to be printed, can be supplied from the outside through the device 28. Pre-dosed pieces of material, or pellets, may preferably be used. At the junction of the insulating plate 26 with the reservoir 7, 27, there is an opening 29 through which the material 14 enters the reservoir 7, 27. The opening 29 can be closed by a device 32, so that it is open preferably only when the material 14 is being supplied, which reduces the radiant energy from the reservoir 7, 27 onto the device 28 for supplying the metal 14.

The reservoir 7, 27 is configured as a melting crucible 27, an inductor 33 being arranged outside the melting crucible 27, and a sensor 34, in particular a temperature sensor, being arranged inside the melting crucible. There may optionally also be an insulator (not represented) between the melting crucible 27 and the inductor 33, or the inductor coil 33.

The metal 14 enters the melting region 20 of the melting crucible in a solid phase 14 and is heated by the inductor 33 until it is converted into a liquid phase 8. When reaching a desired process temperature of the melt 8, which is determined by the temperature sensor 34, the print head 1 may commence operation. The liquid phase 8, or the melt 8, travels past the plunger 18 into the displacement space 21 by the gravitational pressure of the melt 8 or by a combination of gravitational pressure and atmospheric pressure of the inert gas 22. The plunger 18 of the piston 5 is enclosed on a pressure side 19 in the melt 8, or by the melt 8, and on the side of connection to the piston rod 17 in the inert atmosphere 22, or by the inert atmosphere 22. Because of the way in which the process is arranged, the piston rod 17 does not come in contact with the melt 8.

The ceramic of the plunger 18 is advantageously very highly thermally conductive in order to be able to transmit the heat generated by the inductor 33 well into the displacement space 21.

When the piezoelectric actuator 12 is actuated, the pressure side 19 of the plunger 18 exerts a pressure on the melt 8 in the displacement space 21 in the direction of the outlet opening 10, and ensures ejection of a drop 15 through the outlet opening 10 of the reservoir 7, 27, or of the displacement space 21. The outlet opening 10 is configured for the ejection of drops 15 of the liquid phase 8 of the metal 14, in which case the outlet opening 10 may be in the form of a nozzle 10 and be firmly connected to the melting crucible 27 or, as shown in the exemplary embodiment, may comprise a replaceable insert 11 which makes it possible to use different nozzle geometries. This replaceable insert 11 is also referred to as a sleeve 11, or guide sleeve 11, of the piston.

Figure 2:
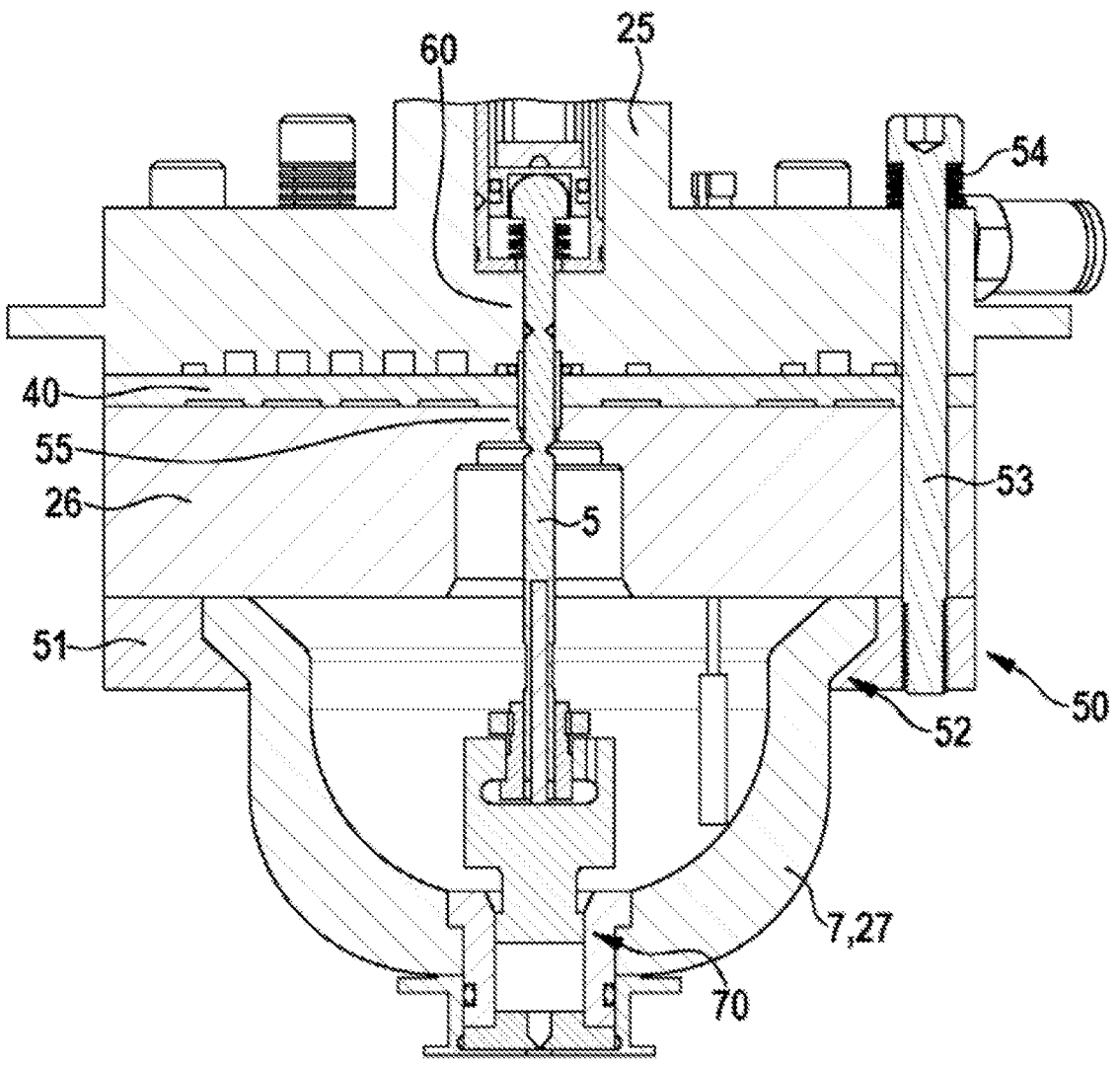
FIG. 2 shows a detail of a print head according to the invention.

FIG. 2 shows a detail of a print head according to the invention, the reservoir 7, 27 being connected by a centering device 50 to the cooling flange 25 and/or the insulating plate 26. The centering device 50 comprises at least a flange 51, a clamping device 53 and a centering sleeve 55. The reservoir 7, 27 is connected to the flange 51 via an active surface 52, in such a way that the reservoir 7, 27 is aligned concentrically with respect to the cooling flange 25 and/or the insulating plate 26. The flange 51 is connected to the cooling flange 25 and/or the insulating plate 26 via the clamping device 53. The clamping device 53 is formed by clamping screws 53, which are braced on the cooling flange 25 by means of disk springs 54. The centering sleeve 55 is arranged in the cooling flange 25 and/or the insulating plate 26 in such a way that the piston 5 is aligned centrally with respect to the reservoir 7, 27.

A cooling plate 40 is arranged between the cooling flange 25 and the insulating plate 26. In the region 60, the cooling flange 25 comprises an initial guide of the piston in the cooling flange 25. Furthermore, the piston 5 is positioned concentrically by means of a further piston guide 70.

The basis of the alignment, or positioning, of the print head 1 is the cooling flange 25. The centering sleeve 55, which assures positioning with respect to the insulator 26, is formed therein. This centering sleeve 55 cannot, however, assure circular alignment. This alignment is carried out by the clamping screws 53, three clamping screws 53 distributed over 120° being formed in this exemplary embodiment.

Since the thermal expansion coefficient is much less than that of metal, the screws 53 are prestressed axially by means of springs 54, for example disk springs 54. This assures that the axial prestress is not affected by play, but also, on the other hand, the prestress is not too great and the brittle ceramic of the reservoir 7, 27, or crucible 7, 27, is not broken. The flange 51 is connected to the reservoir 7, 27 via the conically configured active surface 52. The cone ensures centering of the components.

When the mobile flange 51 then expands more strongly (the diameter becomes about 0.1 mm greater) than the crucible 7, 27 during heating, the flange 51 is shifted upward relative to the crucible 7, 27, which expands less. At the same time, however, it continues to be pressed onto the insulator plate 26, or the insulator 7, 26. During cooling, precisely the opposite takes place. In each case, the position remains assured by the centering sleeve 55 and the circular alignment by the clamping screws 53.

The axial expansion difference, including the manufacturing tolerances, is compensated for in a similar way, specifically between the clamping screw 53 and the ceramic insulator 26.

The invention claimed is:

1. A print head (1) for a 3D printer comprising a housing (3), a device (28) for supplying a metal (14), a piston (5), a reservoir (7, 27) having an outlet opening (10), and an actuator device (12) for driving the piston (5), the reservoir (7, 27) comprising a melting region (20) and a displacement space (21) for a liquid phase (8) of the metal (14), the melting region (20) being adjacent to an inert atmosphere (22) and connected to the displacement space (21) such that the liquid phase (8) of the metal (14) can pass through the outlet opening (10) by driving the piston (5), wherein the housing (3) is configured in a plurality of parts and comprises at least a cooling flange (25), an insulating plate (26) and the reservoir (7, 27), wherein the reservoir (7, 27) is connected to the cooling flange (25) and/or the insulating plate (26) by a centering device (50), wherein the centering device (50) comprises a flange (51), a clamping device (53) and a centering sleeve (55), wherein an active surface (52) connects the reservoir (7, 27) to the flange (51) of the centering device (50) such that the reservoir (7, 27) is concentrically aligned with respect to the cooling flange (25) and/or the insulating plate (26), and wherein the clamping device (53) connects the flange (51) of the centering device (50) to the cooling flange (25) and/or the insulating plate (26);

wherein the centering sleeve (55) is arranged in the cooling flange (25) and/or the insulating plate (26) such that the centering sleeve (55) centrally aligns the piston (5) with respect to the reservoir (7, 27).

2. The print head (1) as claimed in claim 1, wherein the clamping device (53) is formed by clamping screws (53) which are braced on the cooling flange (25) by disk springs (54).

3. The print head (1) as claimed in claim 1, wherein the 3D printer is a metal printer.

\* \* \* \* \*